(12) United States Patent
Manev et al.

(10) Patent No.: US 6,218,048 B1
(45) Date of Patent: Apr. 17, 2001

(54) METHOD OF PRELIMINARILY HEAT TREATING POSITIVE ELECTRODES OF SECONDARY LITHIUM AND LITHIUM-ION BATTERIES AND RESULTING POSITIVE ELECTRODES AND BATTERIES

(75) Inventors: Vesselin Manev; Titus Faulkner, both of Gastonia; D. Wayne Barnette, Kings Mountain; John Francis Engel, Belmont, all of NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/286,969

(22) Filed: Apr. 6, 1999

Related U.S. Application Data

(60) Provisional application No. 60/081,017, filed on Apr. 7, 1998.

(51) Int. Cl.⁷ .................................................. H01M 4/50
(52) U.S. Cl. ..................... 429/224; 429/304; 29/623.1; 29/623.5
(58) Field of Search ..................................... 429/224, 304; 29/623.1, 623.5

(56) References Cited

U.S. PATENT DOCUMENTS

| | | |
|---|---|---|
| 4,547,440 | 10/1985 | Hooper et al. . |
| 4,844,996 | 7/1989 | Peled et al. . |
| 5,028,500 | 7/1991 | Fong et al. . |
| 5,153,082 | 10/1992 | Ogino et al. . |
| 5,616,429 | 4/1997 | Klementowski . |
| 5,695,887 | 12/1997 | Amatucci et al. . |
| 5,705,291 | 1/1998 | Amatucci et al. . |

FOREIGN PATENT DOCUMENTS

| | | |
|---|---|---|
| 0 885 845 | 12/1998 | (EP) . |
| 2 093 629 | 9/1982 | (GB) . |
| 2 319 654 | 5/1998 | (GB) . |
| 61-148771 | 7/1986 | (JP) . |
| 11162511 | 6/1999 | (JP) . |
| 11242955 | 9/1999 | (JP) . |
| WO 96/41394 | 12/1996 | (WO) . |

OTHER PUBLICATIONS

Denis Fauteux, Lithium Electrode/PEO–Based Polymer Electrolyte Interface Behavior Between 60° and 120° C, Journal of Electrochemical Society, vol. 135, No. 9, Sep. 1988 (1988–09), pp. 2231–2232, XP002111321.
European Search Report, Aug. 26, 1999.

*Primary Examiner*—Laura Weiner
(74) *Attorney, Agent, or Firm*—Alston & Bird LLP

(57) ABSTRACT

The present invention includes a method of preparing secondary lithium and lithium-ion batteries with improved coulombic efficiency, improved cycling and storage performance at elevated temperatures, and lower rates of transition metal dissolution. In accordance with the present invention, the positive electrode material is thermally treated at a temperature of between 50° C. and 120° C. to produce a passivating film having lithium ion conductivity. The present invention also includes a secondary lithium or lithium-ion cell having positive electrode material covered with a thermally-activated thin passivating film having lithium ion conductivity and a positive electrode material formed of particles of a lithium intercalation compound with a passivating film on the surface of the particles.

14 Claims, 3 Drawing Sheets

Model of heat activated, lithium ion conductive, polymer electrolyte interface (PEI) on positive spinel electrode

METHOD OF PRELIMINARILY HEAT TREATING POSITIVE ELECTRODES OF SECONDARY LITHIUM AND LITHIUM-ION BATTERIES AND RESULTING POSITIVE ELECTRODES AND BATTERIES

CROSS REFERENCE TO RELATED APPLICATIONS

This application claims the benefit of U.S. Provisional Application Ser. No. 60/081,017, filed Apr. 7, 1998, under 35 U.S.C. § 119(e).

FIELD OF THE INVENTION

This invention relates to secondary lithium or lithium-ion batteries and, in particular, to secondary lithium and lithium-ion batteries with improved cycling, storage and high temperature performance, and methods of preparing same.

BACKGROUND OF THE INVENTION

Lithium intercalation compounds such as $Li_{1+x}Mn_{2-x}O_{4+y}$, $LiCoO_2$, and $LiNiO_2$ have been used in positive electrodes for 4 V and higher than 4 V secondary lithium and lithium-ion batteries. These batteries typically include (1) a positive electrode including a lithium intercalation compound, (2) a negative electrode formed of lithium metal, a lithium alloy or a carbon compound, (3) an electrolyte based on an inorganic lithium salt dissolved in organic solvents, and (4) an appropriate separator.

One of the main drawbacks of 4V or higher secondary lithium and lithium-ion batteries is electrolyte decomposition during the charging process or during the shelf life of the battery in its charged state. The negative effects of this decomposition are considerably accelerated at elevated temperatures. Accordingly, to decrease electrolyte decomposition in conventional cells, low voltage limits are strictly used during the cell charge process.

Another drawback of electrolyte decomposition is that the decomposition products either tend to polymerize or tend to initiate electrolyte polymerization, particularly in solvents containing cyclic esters. This polymerization can block the compartment between the electrodes and cause failure of the cell.

Furthermore, when manganese-rich and cobalt-rich lithiated metal oxides are used as positive electrode materials, manganese and cobalt dissolution can occur in the cell. This dissolution is observed in the electrolyte and results in a reduction in the capacity and cycleability of the cell. In particular, the negative effect of manganese dissolution is more pronounced because it is believed that the dissolved manganese catalyzes electrolyte polymerization and/or decomposition.

SUMMARY OF THE INVENTION

The present invention provides a method of preparing secondary lithium and lithium-ion batteries with improved coulombic efficiency, improved cycling and storage performance at elevated temperatures, and lower rates of transition metal dissolution in the electrolyte, by forming a thermally activated thin passivating film on the positive electrode-electrolyte interface. The passivating film can comprise a polymer electrolyte interface (PEI), a solid electrolyte interface (SEI) or a combination thereof, between the positive electrode material and electrolyte that is permeable to lithium ions but not permeable to the electrolyte solution. In place of or in addition to the PEI or SEI, the passivating film can comprise a polymer interface (PI) covering predominantly the surface of carbon additives distributed throughout the positive electrode composite.

The present invention includes a method of pretreating a positive electrode for a secondary lithium or lithium-ion cell comprising thermally treating a positive electrode in its discharge state and in a liquid nonaqueous electrolyte at a temperature of between 50° C. and 120° C., and preferably between 65° C. and 75° C., to thereby create a thin, passivating film with lithium ion conductivity on the positive electrode. Preferably, the positive electrode is thermally treated for a period of from about one hour to about two months. The positive electrode can either be heat treated prior to producing the secondary lithium or lithium-ion cell or the entire cell can be thermally treated. Alternatively, the positive electrode material can be thermally treated prior to forming the positive electrode composite.

The secondary lithium or lithium-ion cells that can be treated in accordance with the invention are preferably 4 V or higher than 4 V cells and typically include (1) a positive electrode including a lithium intercalation compound, (2) a negative electrode formed of lithium metal, a lithium alloy or a carbon compound, (3) an electrolyte based on an inorganic lithium salt dissolved in organic solvents, and (4) an appropriate separator. The positive electrode material for the secondary lithium and lithium-ion cells can be a lithium intercalation compound and is preferably a lithium manganese spinel. The electrolyte is preferably a liquid, non-aqueous electrolyte that includes a lithium salt such as $LiPF_6$, $LiClO_4$ or $LiBF_4$ dissolved in organic solvents. The organic solvents can include at least one cyclic ester solvent selected from the group consisting of propylene carbonate (PC), ethylene carbonate (EC) and γ-butyrolactone (GBL). For example, the electrolyte can include $LiPF_6$ dissolved in an ethylene carbonate/dimethyl carbonate solvent.

The present invention further provides a secondary lithium or lithium-ion cell comprising a liquid nonaqueous electrolyte, a negative electrode and a positive electrode, at least a portion of a surface of the positive electrode covered with a thermally-activated thin passivating film having lithium ion conductivity such as those described above. The passivating film is formed by thermally treating the positive electrode in a liquid electrolyte preferably containing a lithium salt at a temperature between 50° C. and 120° C., and preferably between 65° C. and 75° C.

In accordance with the invention, the secondary lithium or lithium-ion cell preferably has a coulombic efficiency ($C_{eff}$) of greater than 99% after 250 charge/discharge cycles as defined by the formula:

$$C_{eff} = \frac{Q_{reversible}}{Q_{reversible} + Q_{side\ reactions}} 100\%$$

wherein $Q_{reversible}$ is the reversible capacity of the intercalation process and $Q_{side\ reactions}$ is the capacity of side reactions such as electrolyte decomposition and includes the irreversible capacity loss. When a lithium manganese spinel is used as the positive electrode material, the secondary lithium or lithium-ion cell preferably has a manganese dissolution of less than 1.5% after 400 cycles at 55° C. In addition, the cell preferably has a manganese dissolution of less than 0.2% after 200 cycles at 23° C.

The present invention also includes a positive electrode material comprising particles of a lithium intercalation compound such as lithium manganese spinel particles and a thermally-activated passivating film on the surface of the particles. The passivating film can be an SEI or PEI and is formed by thermally treating the positive electrode material in a liquid electrolyte solution containing a lithium salt at a temperature between 50° C. and 120° C.

These and other features and advantages of the present invention will become more readily apparent to those skilled in the art upon consideration of the following detailed description and accompanying drawings, which describe both the preferred and alternative embodiments of the present invention.

DETAILED DESCRIPTION OF THE PREFERRED EMBODIMENTS

Figure 1:
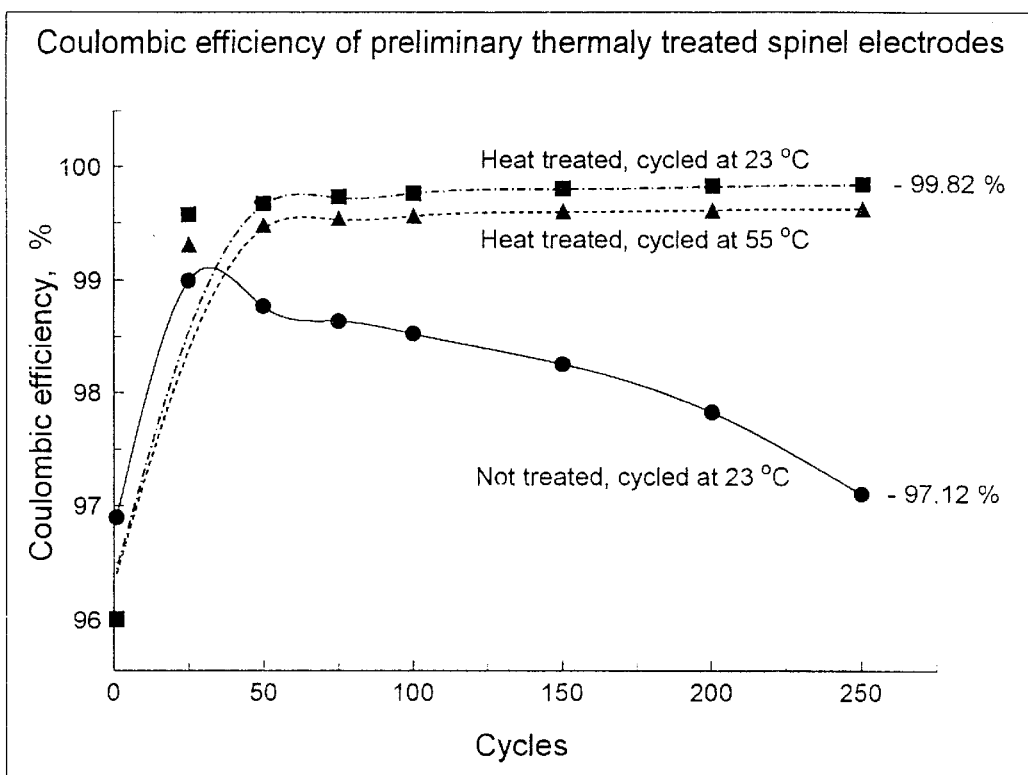
FIG. 1 is a graph illustrating a comparison between the coulombic efficiency of a $LiMn_2O_4$ spinel electrode of an untreated control secondary lithium cell cycled at 23° C., and the coulombic efficiency of $LiMn_2O_4$ spinel electrodes of cells treated for 2 weeks at 65° C. and cycled at 23° C. and 55° C., respectively.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

It has been discovered that the preliminary thermal treatment of the positive electrode of a secondary lithium or lithium-ion cell in its discharge state at a temperature of between 50° C. and 120° C. and for a period from about one hour to about two months can substantially raise the positive electrode coulombic efficiency of the cell. Preferably, the preliminary heat treatment is carried out at between 65° C. and 75° C. In particular, it has been determined that at temperatures below 65° C., the pretreatment time necessary to produce the passivating film is longer than desired. For example, even at 65° C., the heat treatment preferably occurs for about 2 weeks to form the passivating film. Alternatively, at heat treatment temperatures above 75° C., electrolyte decomposition occurs and can result in failure of the cell. Accordingly, at 75° C., the cell is preferably treated for 24 hours or less.

The coulombic efficiency can be defined by the ratio of the reversible capacity of the intercalation process to the sum of the reversible capacity of the intercalation process and the capacity of the side reactions according to the following equation:

$$C_{eff} = \frac{Q_{reversible}}{Q_{reversible} + Q_{side\ reactions}} 100\%$$

wherein $Q_{reversible}$ is the reversible capacity of the intercalation process and $Q_{side\ reactions}$ is the capacity of side reactions such as electrolyte decomposition and includes the irreversible capacity loss.

As illustrated in FIG. 1, it has been discovered that after 250 cycles, the coulombic efficiency of the $LiMn_2O_4$ spinel positive electrode of a heat treated cell in its discharge state is extremely high, about 99.8%, while the coulombic efficiency of the untreated control cell is only 97.1%. By using the above equation and the data shown in FIG. 1, it can be estimated that the capacity of the side reactions occurring in the positive electrode of the untreated cell is more than one order of magnitude higher than the capacity of the side reactions occurring in the positive electrode of the treated cell. Because the main side reaction is electrolyte oxidation, it follows that preliminary heat treatment of the cell considerably suppresses (by more than one order of magnitude) electrolyte oxidation during cycling.

Figure 2:
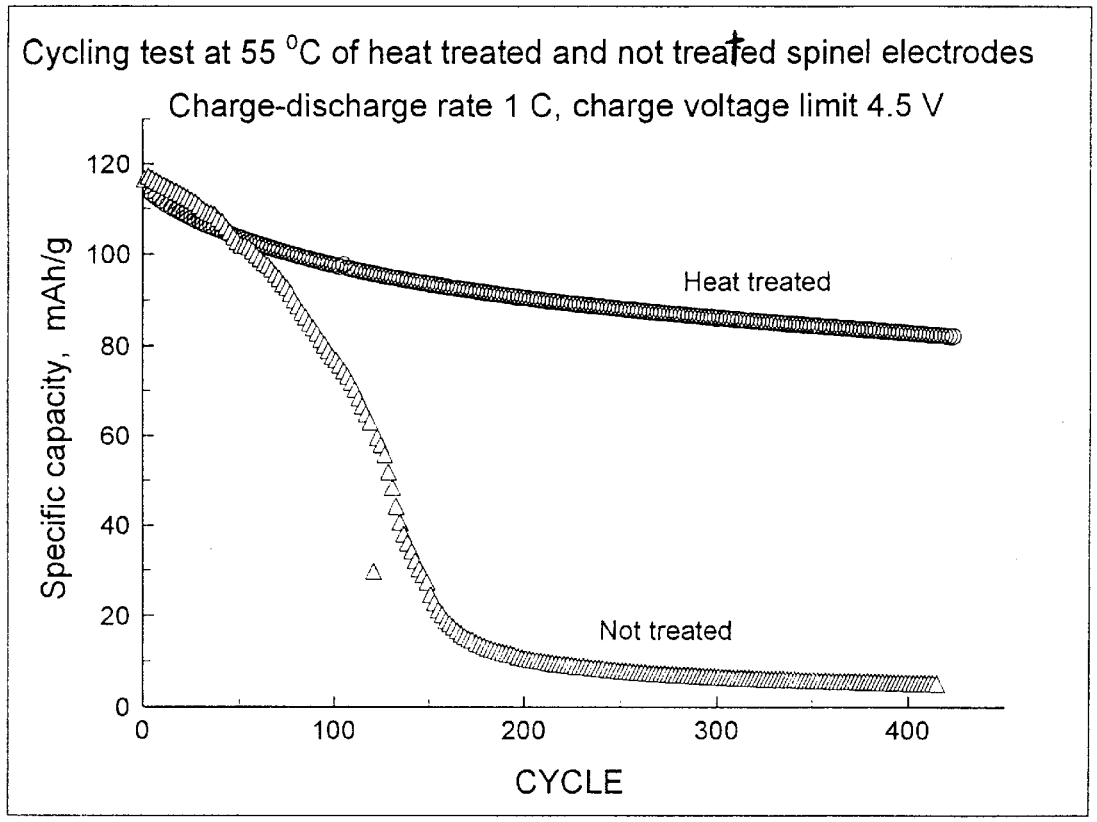
FIG. 2 is a graph illustrating the comparison between the cycling performance at 55° C. of a $LiMn_2O_4$ spinel electrode of a secondary lithium cell heat treated at 65° C. for two weeks and the $LiMn_2O_4$ spinel electrode of an untreated control cell.

It has been further discovered that the preliminary heat treatment of the positive electrode of secondary lithium and lithium-ion cells greatly improves the spinel electrode cycleability, and particularly its cycleability at elevated temperatures. FIG. 2 demonstrates this improvement by comparing the cycling performance of preliminary heat-treated and untreated cells at 55° C. In the untreated cell, the number of cycles is typically limited by electrolyte polymerization thereby resulting in a rapid capacity fade as illustrated in FIG. 2. This electrolyte polymerization can be accelerated by temperature, electrolyte oxidation, and the presence of dissolved manganese. The heat-treated cell, on the other hand, experiences a much slower capacity fade than the untreated cell.

In addition to the improvement in coulombic efficiency and cycling performance, the preliminary heat treatment of the positive electrode or cell unexpectedly results in reduced dissolution of the transition metal in the positive electrode, especially in lithium-manganese spinels, e.g., $LiMn_2O_4$. For example, in cells containing $LiMn_2O_4$ as the positive electrode material, the amount of manganese dissolved in the electrolyte after 200 cycles is typically in the range of 0.5–0.6%, while after preliminary heat treatment of the cell at 65° C. for two weeks, the dissolved manganese after 200 cycles is only about 0.15%. The reduction in manganese solubility is even more pronounced when the cell is cycled at 55° C. For example, the amount of manganese dissolved in $LiMn_2O_4$ cells with $EC:DMC/LiPF_6$ as the electrolyte and cycled at 55° C., is typically in the range of 1.5–1.8% for 100 cycles. In contrast, the manganese dissolved in a heat-treated cell after 430 cycles at 55° C. is only 1.2%. Therefore, the preliminary heat treatment of a lithium-manganese spinel positive electrode reduces subsequent manganese dissolution.

Although not wishing to be bound by a particular theory, it is believed that the considerable improvement in electrochemical performance after preliminary heat treatment is caused by the creation of a thermally activated, thin passivating film on the surface of the positive electrode material. The thermally activated passivating film may be either a polymer electrolyte interface (PEI), a solid electrolyte interface (SEI) or a combination thereof, with lithium ion conductivity, which separates the positive electrode material from direct contact with the electrolyte, and/or a polymer interface (PI) predominantly covering the surface of the carbon additives distributed throughout the positive electrode composite. The PEI, SEI and PI are created on the positive electrode material by a thermally activated reaction catalyzed by a transition metal compound, by its ions, by the carbon additives in the positive electrode composite, or by other additives added to the positive electrode to accelerate the formation of the passivating film. It is believed that the PEI forms a lithium-containing polymer film on the surface of the positive electrode material while the SEI forms a manganese-containing and/or lithium-containing inorganic film on the surface of the positive electrode material as a result of the treatment at a temperature of between 50° C. and 120° C., preferably between 65° C. and 75° C.

Figure 3:
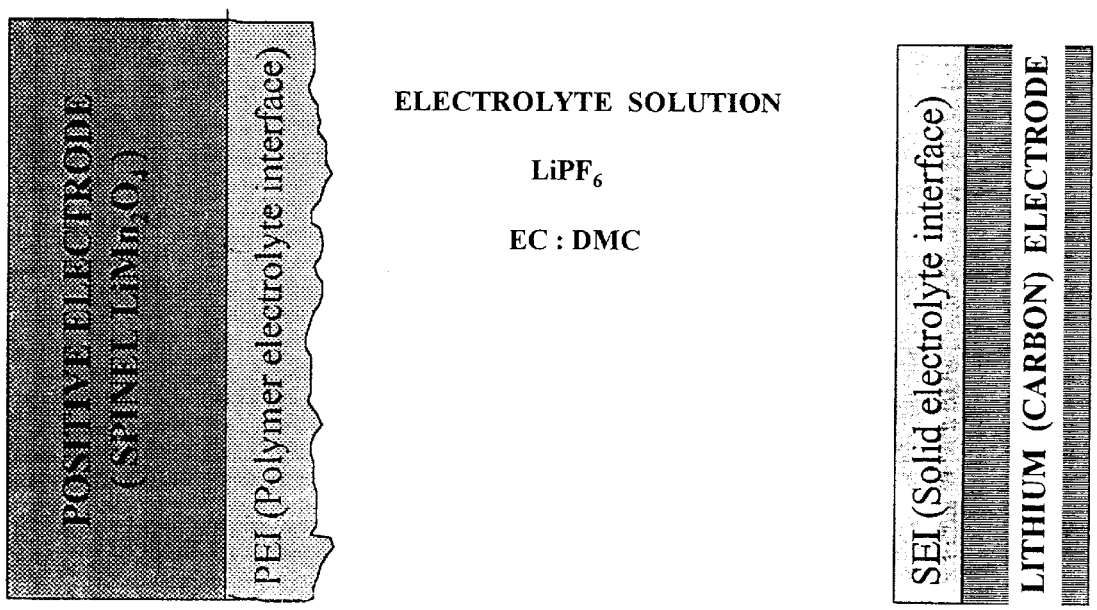
FIG. 3 shows a schematic representation of a cross-section of an electrochemical cell with a heat-activated, lithium-ion conductive polymer electrolyte interface (PEI) on the positive electrode and a solid electrolyte interface (SEI) on the negative electrode.

According to one aspect of the present invention, a polymer electrolyte interface (PEI) or solid electrolyte interface (SEI) is produced on the positive electrode material by the formation of a thermally activated thin passivating film that partially or completely separates the electrolyte from direct contact with the positive electrode material without affecting the electrochemical reaction of lithium intercalation because of lithium ion conductivity or permeability of the PEI or SEI. By preventing direct contact between the electrolyte and the lithium manganese spinel positive electrode, manganese dissolution and electrolyte oxidation are considerably reduced therefore resulting in reduced electrolyte polymerization. A schematic representation of a heat-activated, lithium-ion conductive polymer electrolyte interface (PEI) on the positive electrode is shown in FIG. 3. As shown in FIG. 3, a solid electrolyte interface (SEI) can also be present on the negative electrode; however, this solid electrolyte interface should not be confused with the SEI formed on the positive electrode in accordance with the present invention.

According to another aspect of the present invention, a thermally activated polymer passivating film or polymer interface (PI) may be created predominantly on the surface of carbon additives in the positive electrode composite thereby suppressing electrolyte oxidation. This PI passivating film limits the oxidation of the electrolyte by the carbon additives that can have an even greater effect on electrolyte oxidation than the transition metal compounds. Furthermore, because electrolyte oxidation is believed to cause manganese dissolution in cells containing lithium-manganese spinel as the positive electrode material, suppressing electrolyte oxidation results in a decrease in manganese dissolution. The decrease in electrolyte oxidation and manganese dissolution also reduces electrolyte polymerization at both room temperature and elevated temperatures. As a result, the risk of electrolyte polymerization at voltages higher than 4.1 and 4.2V is decreased and the cell can be operated at higher voltages thereby increasing the specific capacity of the cell.

To provide secondary lithium and lithium-ion batteries with improved coulombic efficiency, cycling and storage performance and a lower rate of transition metal dissolution, according to the present invention, a positive electrode is subjected to a heat treatment in discharge state for a period from about one hour to about two months and at a temperature of between 50° C. and 120° C., preferably between 65° C. and 75° C. The positive electrode can be heat treated prior to forming the cell or after formation of the cell to produce a passivating film on the surface of the positive electrode material. Alternatively, the positive electrode material can be heat treated in a liquid electrolyte solution containing a lithium salt prior to the formation of the positive electrode composite. The secondary cell, positive electrode or positive electrode material preferably has been freshly prepared when subjected to heat treatment, i.e., treated immediately after its preparation, to minimize possible negative effects resulting from products present in the electrolyte as a result of aging or side reactions between the electrolyte solution and cell electrodes.

It is understood that upon reading the above description of the present invention and reviewing the accompanying drawings, one skilled in the art could make changes and variations therefrom. These changes and variations are included in the spirit and scope of the following appended claims.

That which is claimed:

1. A method of pretreating a freshly prepared, positive electrode for a secondary lithium or lithium-ion cell comprising thermally treating a positive electrode in its discharge state and in a liquid nonaqueous electrolyte at a temperature of between 50° C. and 120° C. to thereby create a thin, passivating film with lithium ion conductivity on the positive electrode.

2. The method according to claim 1 wherein said step of thermally treating comprises thermally treating the positive electrode at a temperature of between 65° C. and 75° C.

3. The method according to claim 1 wherein said step of thermally treating comprises thermally treating the positive electrode for a period of from about one hour to about two months.

4. The method according to claim 1 wherein said positive electrode is included in a secondary lithium or lithium-ion cell and the entire cell is thermally treated.

5. The method according to claim 1 wherein said step of thermally treating comprises thermally treating the cell to form a polymer electrolyte interface (PEI) on the surface of the positive electrode.

6. The method according to claim 1 wherein said step of thermally treating comprises thermally treating the cell to form a solid electrolyte interface (SEI) on the surface of the positive electrode.

7. The method according to claim 1 wherein said positive electrode includes carbon additives distributed throughout the positive electrode and said step of thermally treating additionally forms a heat activated polymer interface (PI) on the surface of the carbon additives.

8. The method according to claim 1 wherein said step of thermally treating comprises thermally treating a cell having an electrolyte comprising at least one cyclic ester solvent selected from the group consisting of propylene carbonate (PC), ethylene carbonate (EC) and γ-butyrolactone (GBL).

9. The method according to claim 1 wherein said step of thermally treating comprises thermally treating a cell having a liquid nonaqueous electrolyte comprising a lithium salt.

10. The method according to claim 9 wherein the lithium salt is $LiPF_6$, $LiClO_4$ or $LiBF_4$.

11. The method according to claim 1 wherein the positive electrode comprises lithium manganese spinel.

12. The method according to claim 1, further comprising the step of producing a secondary lithium or lithium-ion cell including the heat-treated positive electrode.

13. A method of treating freshly prepared, positive electrode material for a secondary lithium or lithium-ion cell comprising thermally treating positive electrode material in its discharge state and in a liquid electrolyte containing a lithium salt at a temperature of between 50° C. and 120° C. to thereby create a thin, passivating film with lithium ion conductivity on the positive electrode material.

14. The method according to claim 13 further comprising the step of forming a positive electrode with the thermally treated positive electrode material.

* * * * *

UNITED STATES PATENT AND TRADEMARK OFFICE
CERTIFICATE OF CORRECTION

PATENT NO. : 6,218,048 B1
DATED : April 17, 2001
INVENTOR(S) : Manev et al.

Page 1 of 1

It is certified that error appears in the above-identified patent and that said Letters Patent is hereby corrected as shown below:

<u>Column 6,</u>
Line 54, cancel "freshly prepared,";
Line 56, after "treating" insert -- freshly prepared, --.

Signed and Sealed this

Thirteenth Day of November, 2001

Attest:

*Nicholas P. Godici*

NICHOLAS P. GODICI
*Attesting Officer*     *Acting Director of the United States Patent and Trademark Office*